United States Patent [19]

Kawamura et al.

[11] Patent Number: 4,482,991

[45] Date of Patent: Nov. 13, 1984

[54] DISK RECORDING AND REPRODUCING DEVICE

[75] Inventors: Ichiro Kawamura, Osaka; Izumi Hino, Kyoto; Makoto Fujita, Osaka, all of Japan

[73] Assignee: Matsushita Electric Industrial Co., Ltd., Osaka, Japan

[21] Appl. No.: 387,494

[22] Filed: Jun. 11, 1982

[30] Foreign Application Priority Data

Jun. 15, 1981 [JP] Japan ................... 56-91856

[51] Int. Cl.³ .............................................. G11B 3/58
[52] U.S. Cl. ................... 369/77.2; 294/115; 369/292
[58] Field of Search ............... 369/75, 77, 79, 292; 294/115

[56] References Cited

U.S. PATENT DOCUMENTS

| | | | |
|---|---|---|---|
| 1,478,727 | 12/1923 | Brosious | 294/115 |
| 1,813,918 | 7/1931 | Fisher | 294/115 |
| 2,853,336 | 9/1958 | Cruikshank et al. | 294/115 |
| 3,125,369 | 3/1964 | Copping | 294/115 |
| 3,718,362 | 2/1973 | Butz | 294/115 |
| 4,352,174 | 9/1982 | Tajima et al. | 369/77.2 |
| 4,398,281 | 8/1983 | Hughes | 369/77.2 |

*Primary Examiner*—Steven L. Stephan
*Attorney, Agent, or Firm*—Burgess, Ryan & Wayne

[57] ABSTRACT

A disk clamping mechanism for disk recording and reproducing devices of the type in which when a disk cartridge with a disk enclosed therein is inserted into the device the disk clamping mechanism is actuated to clamp the raised groove guard formed around the rim of the disk so that when the cartridge is pulled out of the device the disk remains therein. The clamping mechanism includes a pair of clamping fingers with projections adapted for engagement with the groove guard when the forces pulling out the cartridge are transmitted to the disk. A linkage or a mechanism comprising a wedge and tapered surfaces is operatively connected to the clamping fingers in such a way that when a pulling force is exerted on the disk and the clamping fingers, the linkage or mechanism causes the clamping arms or fingers to move further toward each other, thus exerting a stronger clamping force on the disk.

8 Claims, 24 Drawing Figures

DISK RECORDING AND REPRODUCING DEVICE

BACKGROUND OF THE INVENTION:

1. Field of the Invention

The present invention relates to a disk recording and reproducing device and, more particularly, a device for playing disks which are normally enclosed in protective cartridges.

2. The Prior Art

There have been devised and used various disk recording and reproducing devices of the type in which, when a cartridge with a disk enclosed therein is inserted through an insertion slot into the device, a disk clamping means is actuated to clamp the groove guard formed around the rim of the disk while the cartridge is being pulled out of the device, so that the disk is pulled out of the cartridge.

In general, the disk cartridge is manually inserted into or pulled out of the disk recording and reproducing device, so that the cartridge is frequently bent, especially when it is pulled out of the device. As a result, the ridge-shaped groove guard of the disk is forced against the inner surfaces of the cartridge, so that frictional forces are exerted on the disk to pull it out of the clamping mechanism. If the disk is pulled out of the clamping mechanism, not only the disk but also the recording and reproducing device are damaged. However, there has not yet been proposed a mechanism to prevent undesired release of the disk.

SUMMARY OF THE INVENTION

An object of the present invention is to solve the above and other problems encountered in prior art disk recording and reproducing devices of the type described above.

A disk clamping mechanism in accordance with the present invention comprises a base which is secured to the main body of a disk recording and reproducing device and a means which is adapted to receive the pulling forces exerted on a cartridge and which has a finger or fingers connected to a rotating member or linkages and adapted to clamp the groove guard of the disk in the cartridge, whereby when the cartridge is pulled out, said rotating member is rotated, so that the clamping forces of the fingers are increased.

DESCRIPTION OF THE PRIOR ART

The present invention relates to a disk recording and reproducing device of the type in which when a disk cartridge is inserted into the device, a disk which is enclosed in the cartridge is automatically extracted out of the cartridge and placed at the drive position: while when the cartridge is pulled out of the device, the disk is automatically enclosed within the cartridge. The present invention has for its object to improve the reliability of operation of the disk cartridge, especially in the step of pulling the disk out of it. The present invention will be described first in conjunction with the prior art disk cartridges and recording and reproducing devices, to both of which the present invention can be applied.

Figure 1:
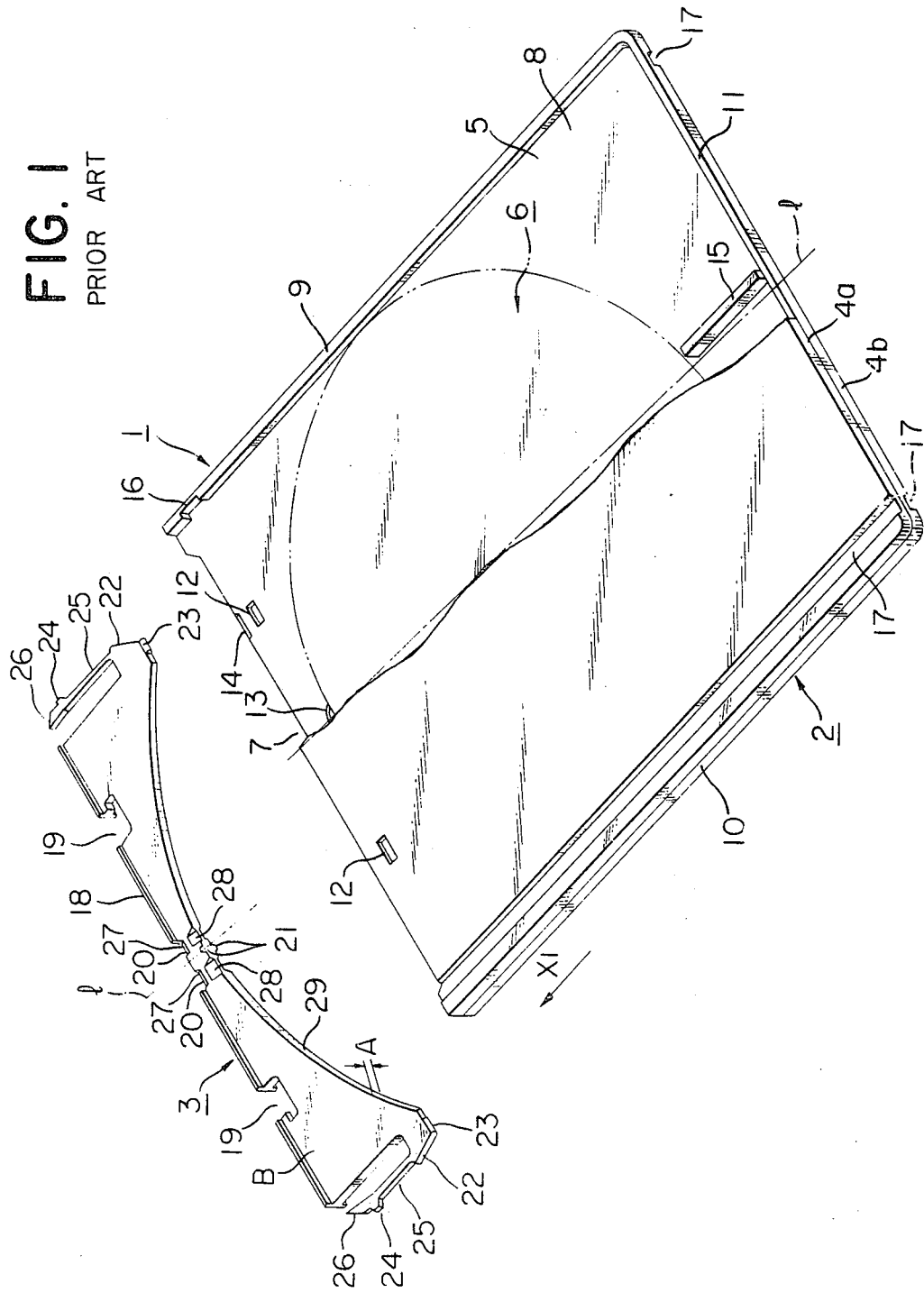
Fig. 1 is a perspective view of a prior art disk cartridge which is used in the present invention, part of the main body of the cartridge being broken away.
Figure 2:
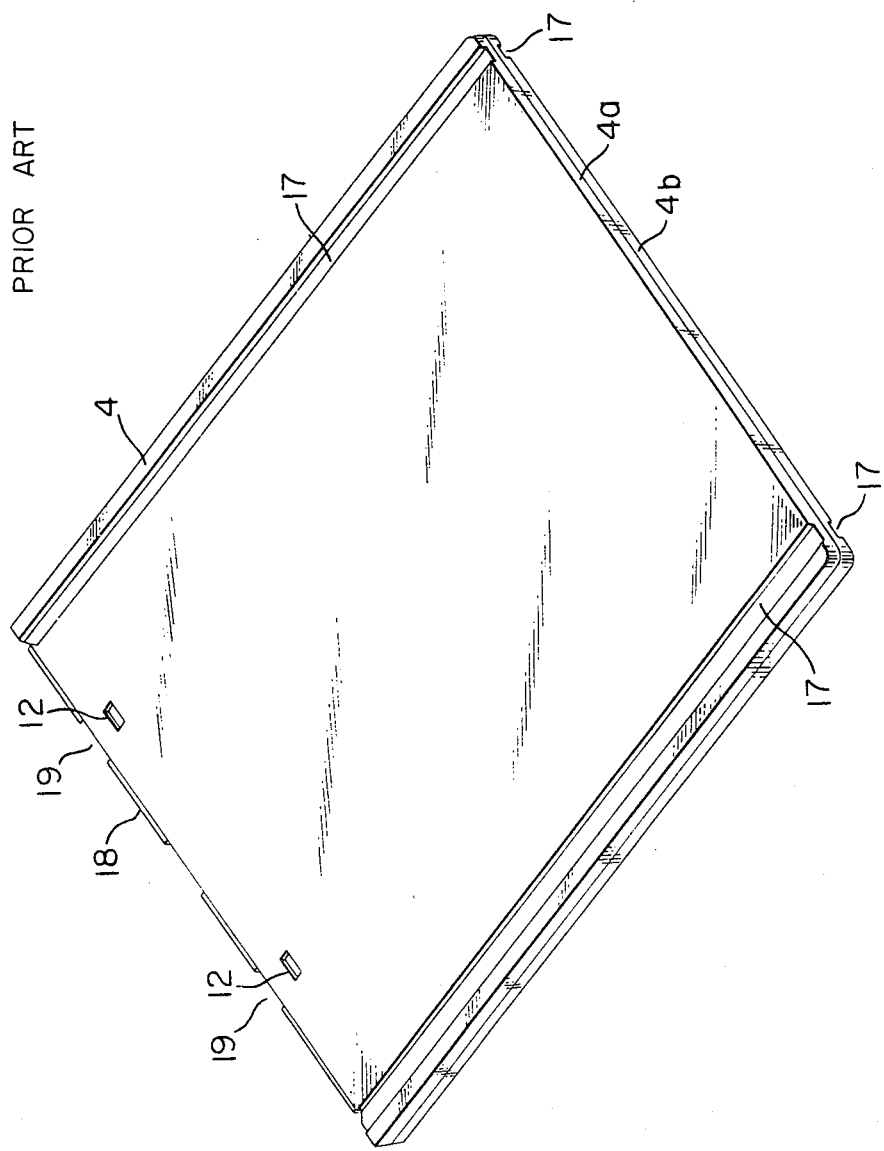
FIG. 2 is a view similar to FIG. 1 but illustrates that the cover of the prior art disk cartridge is attached to the main body thereof and a disk is enclosed therein.
Figure 3A:
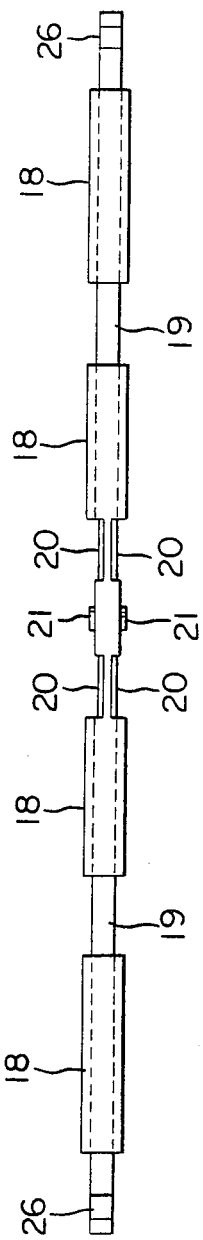
FIGS. 3A, 3B and 3C are front, top and side views, respectively, of the cover of the prior art disk cartridge.
Figure 3B:
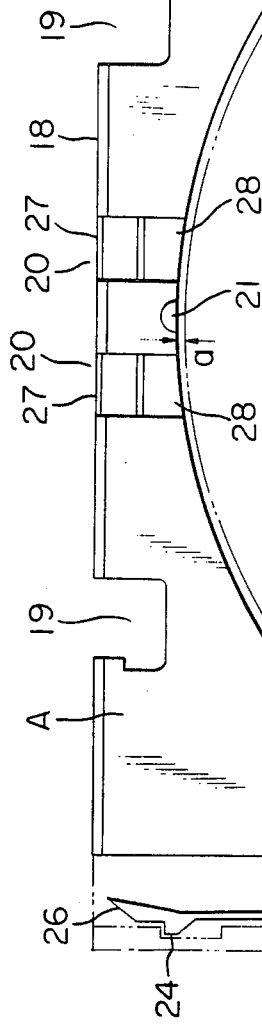
Figure 3C:
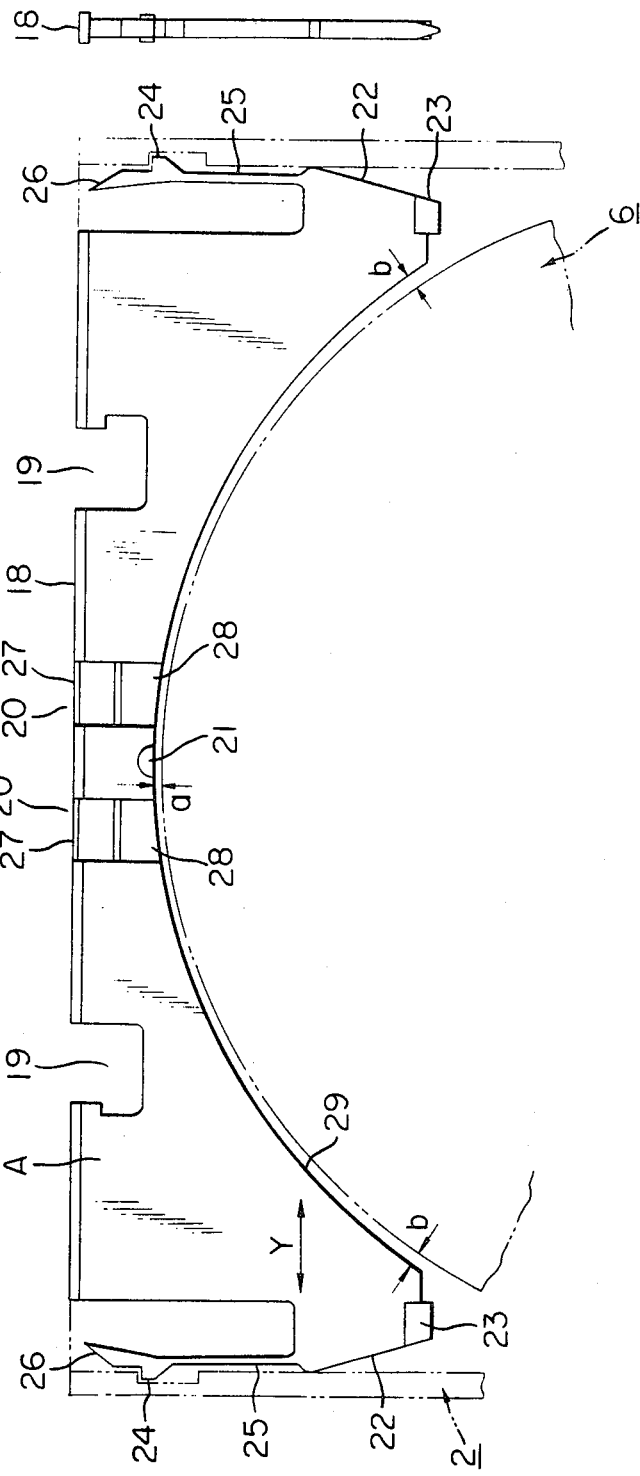

In FIGS. 1, 2 and 3 there is shown a disk cartridge which can be used with a disk recording and reproducing device in accordance with the present invention. A disk cartridge generally indicated by the reference numeral 1 is rectangular in shape and comprises the main body 2 and the cover 3, which can be detachably attached to the open end of the main body 3. The cartridge 1 is pushed into the recording and reproducing device in the direction indicated by the arrow $X_l$ in FIG. 1. Both the main body 2 and cover 3 can be made of, for instance, polystyrene plastics.

The main body 2 comprises a pair of upper and lower halves or parts 4a and 4b which can be cast or otherwise formed with the same mold and are securely joined together with an adhesive. The upper and lower halves 4a and 4b define a disk storage space 5 which is almost flat and equal in dimension to the main body 2 (the height of the storage space 5 being almost equal to the thickness of a disk 6 which is enclosed within this space 5). The storage space 5 has a front opening 7 and three side walls 9, 10 and 11. The main body 2 is symmetrical about the center line l and about the plane containing it.

Each of the upper and lower halves 4a and 4b comprises a flat portion 8 which has two parallel elongated grooves 17 (which serve to cause "a hinge-action" as will be described below) and three side edge portions 9, 10 and 11. As best shown in FIG. 1, the upper and lower halves 4a and 4b are provided with two engaging slots 12 which are opened adjacent to the front end of the flat portion 8 and are symmetrical about the center line l. The slots 12 are adapted to engage with expanding arms to be described in detail below. The flat portion 8 is also provided with a recess 13 for engagement with a projection of the cover 3 to be described in detail below. The front end of the flat portion 8 has tapered portions 14 which are symmetrical about the center line l and serve to guide the expanding arms. The flat portion 8 has a block or ridge portion 15 which extends a predetermined distance from the rear end of the flat portion in parallel with the center line 1 and spaced apart therefrom by a predetermined distance in the transverse direction. The front end of the block or ridge portion 15 is adapted to engage with the rim of the disk 6. The inner walls of the side edges 9 and 10 are formed with recesses 16 which are adjacent to the open front end of the main body and are for engagement with projections 10 of the cover 3 which will be described in detail below. The upper and lower halves 4a and 4b with the above-described construction are securely joined together with an adhesive which is wholly or partially applied to the mating surfaces of the side edges 9, 10 and 11 of the upper and lower halves 4a and 4b.

The cover 3 has a plurality of front wall or flange portions 18 which are transversely spaced apart from each other as best shown in FIG. 3A and are adapted to partly close the opening 7 of the main body 2 when the cover 3 is attached thereto. The front end or edge of the cover 3 is also formed with notches or recesses 19 which are symmetrical about the center line 1 and into which are inserted the expanding arms; and guide grooves 20 which are also symmetrical about the center line 1 and the horizontal center plane of the cover 3 and which comprises (i) a tapered portion 27 adapted to guide a disk-clamping arm to be described below and (ii) a thin-wall portion 28 which is less in thickness than the groove guard portion of the disk 6. The projections 21 are extended from both the upper and lower surfaces of the cover 3 in line with the center line 1 for engagement with the recesses 13 of the main body 2. As best shown in FIG. 3B, the cover 3 has further inwardly (that is, toward the center line 1 ) tapered side edge portions 22 and rearwardly directed tapered portions 23, both of which serve to guide the insertion of the cover 3 into the main body 2. The cover 3 is further provided with elastic arms 25 with projections 24 which are adapted to engage with the recesses 16 of the main body 2 so as to securely hold the cover 3 relative to the main body 2. The front ends of the arms 25 are terminated into tapered portions 26 for engagement with releasing means to be described below.

FIG. 2 shows the disk cartridge 1 which is the assembly of the above-described main body 2 and cover 3 with the disk 6 enclosed. Referring to FIGS. 1 and 2, the rim of the disk 6 enclosed in the main body 2 is engaged with the front ends of the disk blocks or ridges 15 so that the backward movement of the disk 6 is limited. Transverse movements of the disk 6 are prevented by the side edges 9 and 10 of the main body. The cover 3 is inserted into the main body 2 through the front opening 7, which is defined by the upper and lower halves 4a and 4b as described above. Then the projections 24 engage the recesses 16 of the main body 2 while the projections 21 engage the recesses 13. (The flat portions 8 of the upper and lower halves 4a and 4b of the main body 2 are elastically spaced apart from each other.) When the cover 3 is fully inserted into the main body 2, the front wall or flange portions 18 of the cover 3 partially close the front opening 7 of the main body (See FIG. 3A).

When the cover 3 is attached to the main body 2 in the manner described above, the rim of the disk 6 engages an arcuate rear edge 29 of the cover 3 so that the disk 6 is prevented from falling from or being pulled away from the main body 2 through the front opening 7 thereof. The portion of the cover 3 which is inserted into the main body 2 is substantially equal in thickness to the height of the flat disk storage space 5, so that the disk 6 is also prevented from falling through the spaces between the main body 2 and the cover 3 inserted therein.

The construction of the cover 3 is shown in detail in FIG. 3. It is seen that the spacing between the rim of the disk 6 and the arcuate rear edge of the cover 3 gradually increases from the center (where the spacing a is minimum) toward the ends of the arcuate rear edge 29 (where the spacing is b). The reason for this invention is so that even when the cover 3 and the disk 6 are transversely displaced relative to each other in the directions indicated by the double-pointed arrow Y, stable drive of the disk 6 may be ensured in the reproduction or recording mode.

Figure 4:
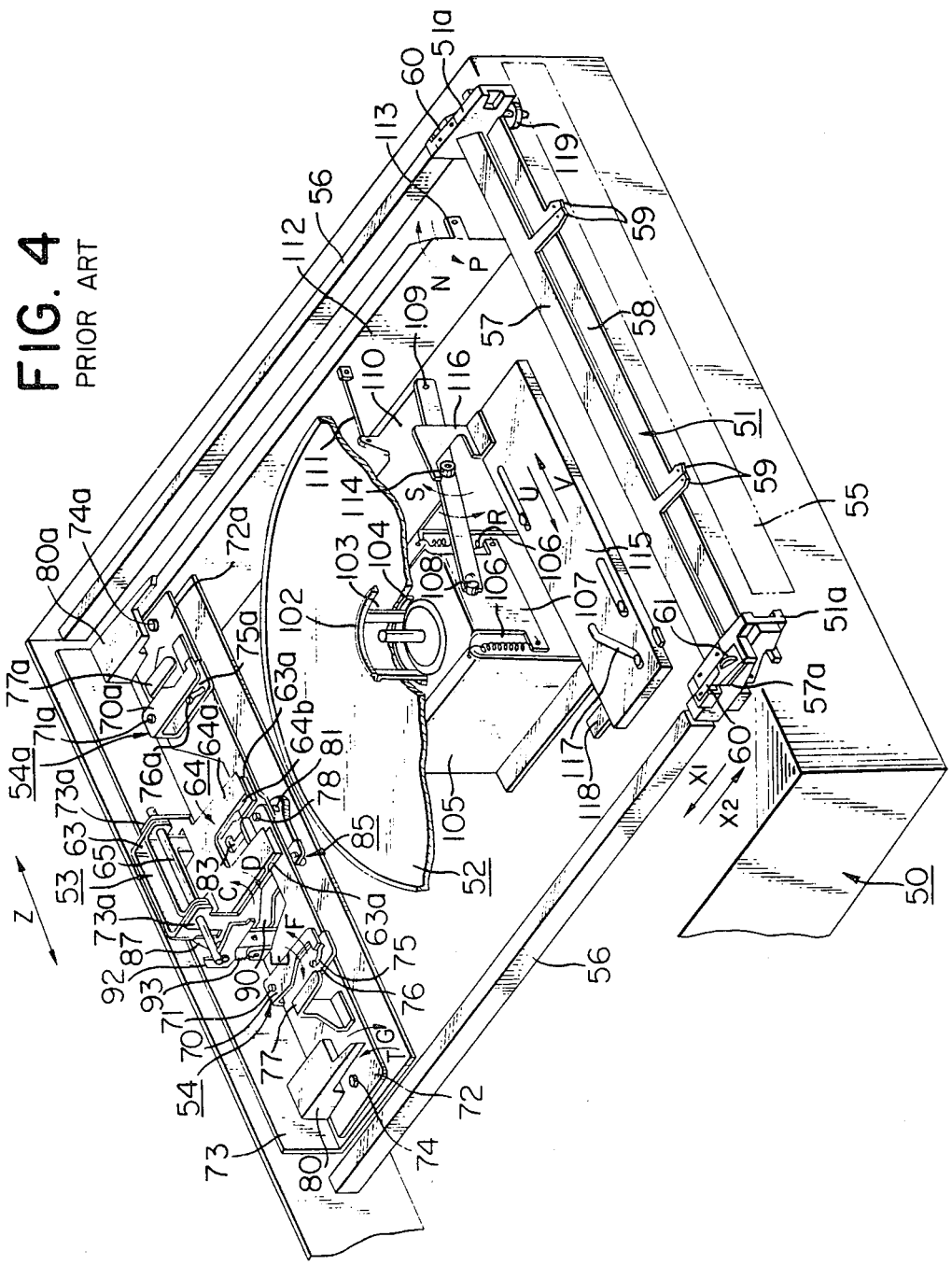
FIG. 4 is a perspective view, partly broken away, of a prior art disk reproducing device.
Figure 5:
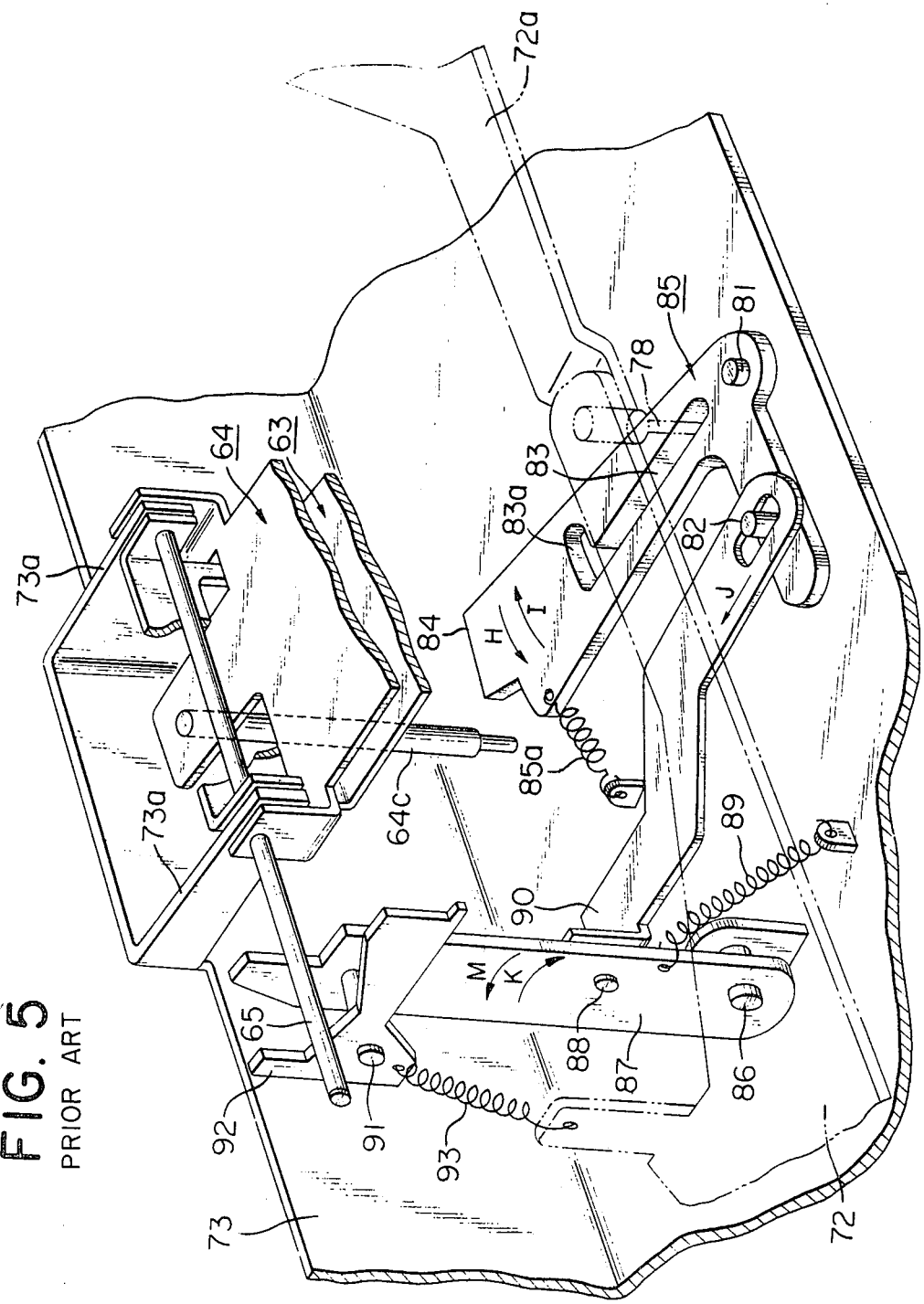
FIG. 5 is a partial perspective view, on enlarged scale, of the disk reproducing device shown in FIG. 4 illustrating major components.
Figure 6:
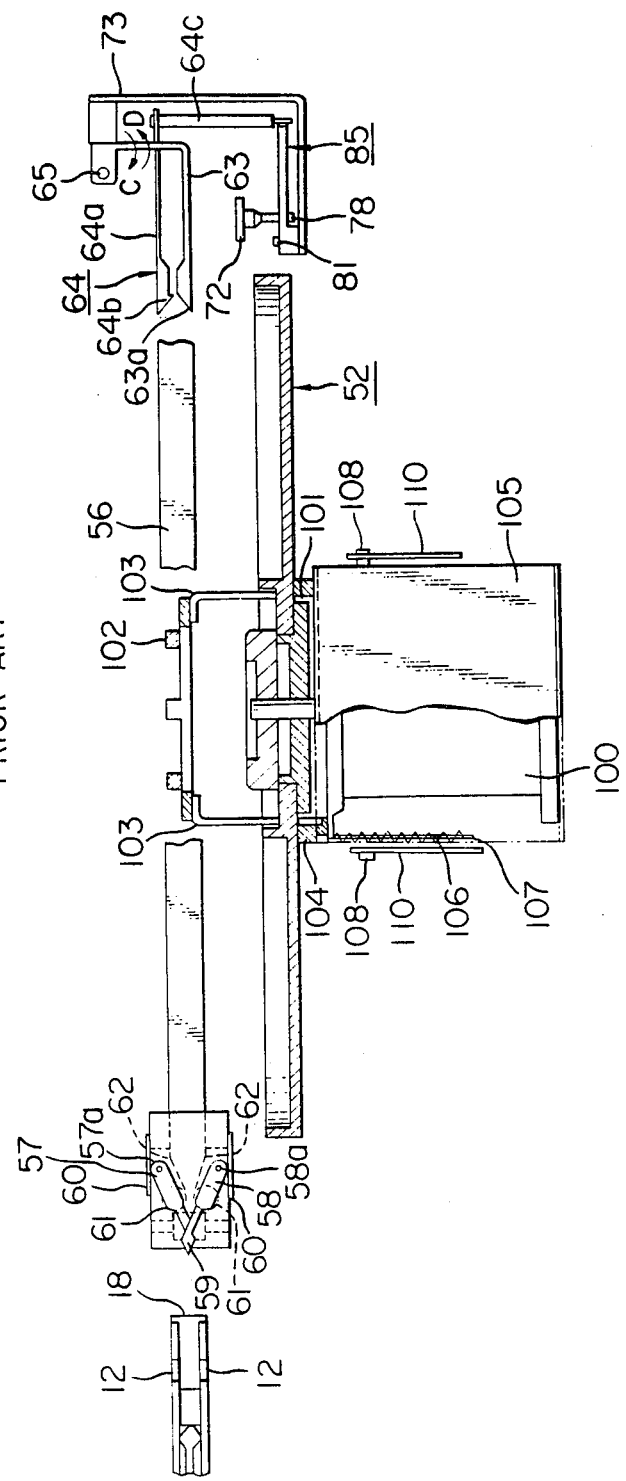
FIG. 6 is a side view of the disk reproducing device shown in FIG. 4.
Figure 7A:
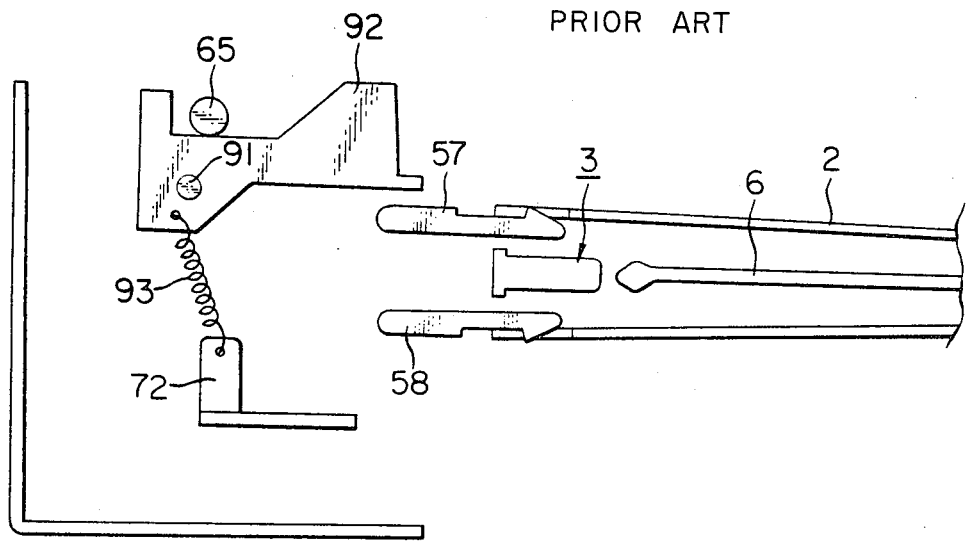
FIGS. 7A and 7B are side views of an engaging member and its associated parts of the disk reproducing device shown in FIG. 4, and are used to explain the mode of operation of the engaging member.
Figure 7B:
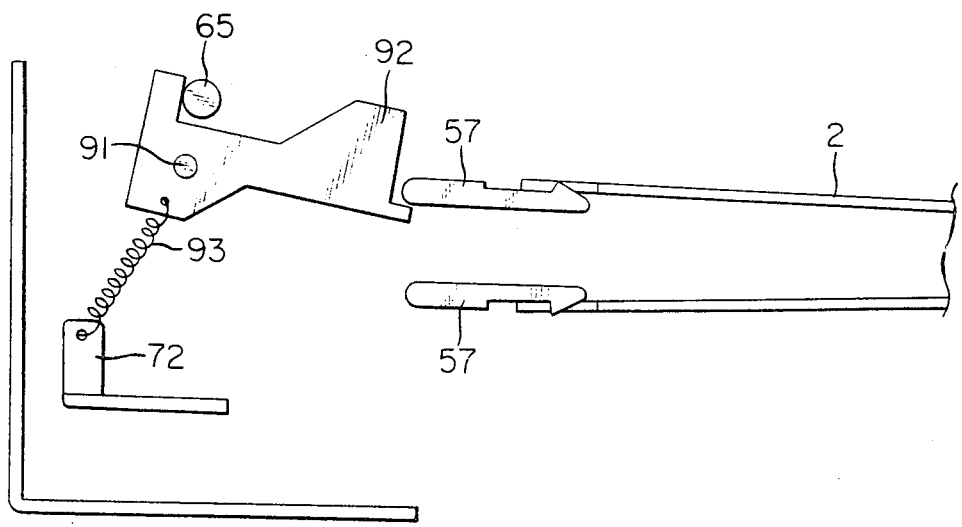
Figure 8A:
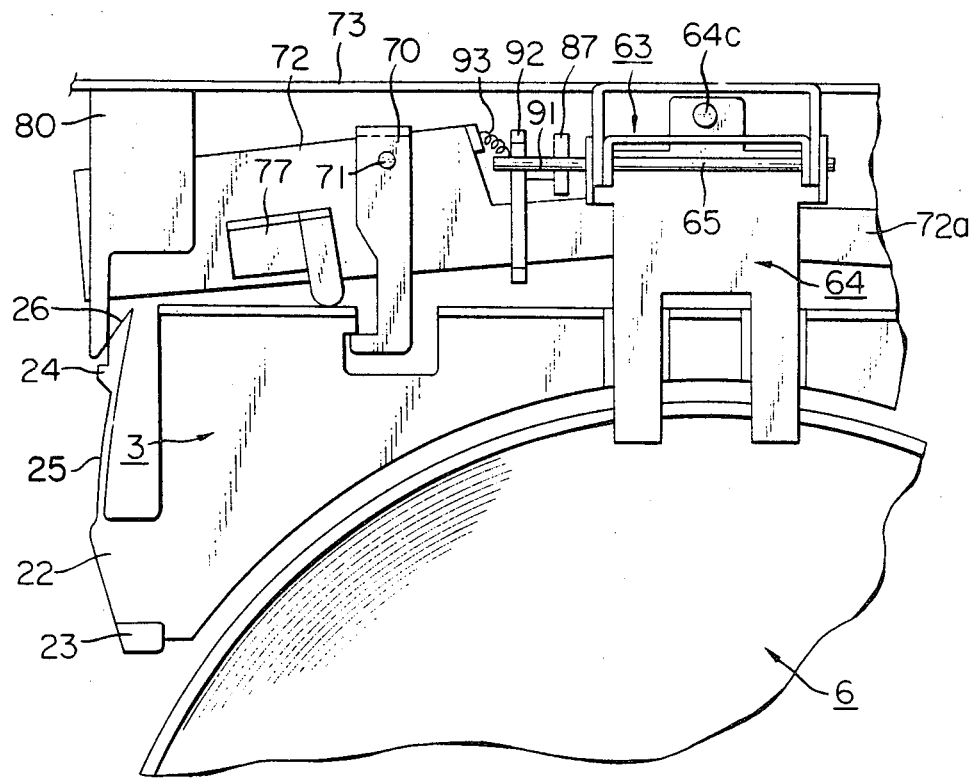
FIG. 8A is a partial top view of the disk reproducing device shown in FIG. 4.
Figure 8B:
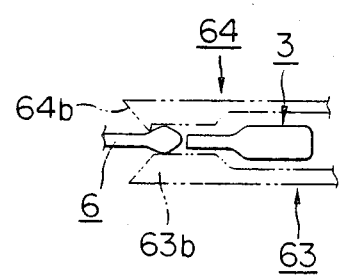
FIG. 8B is a partial side view of the disk reproducing device shown in FIG. 4.
Figure 9:
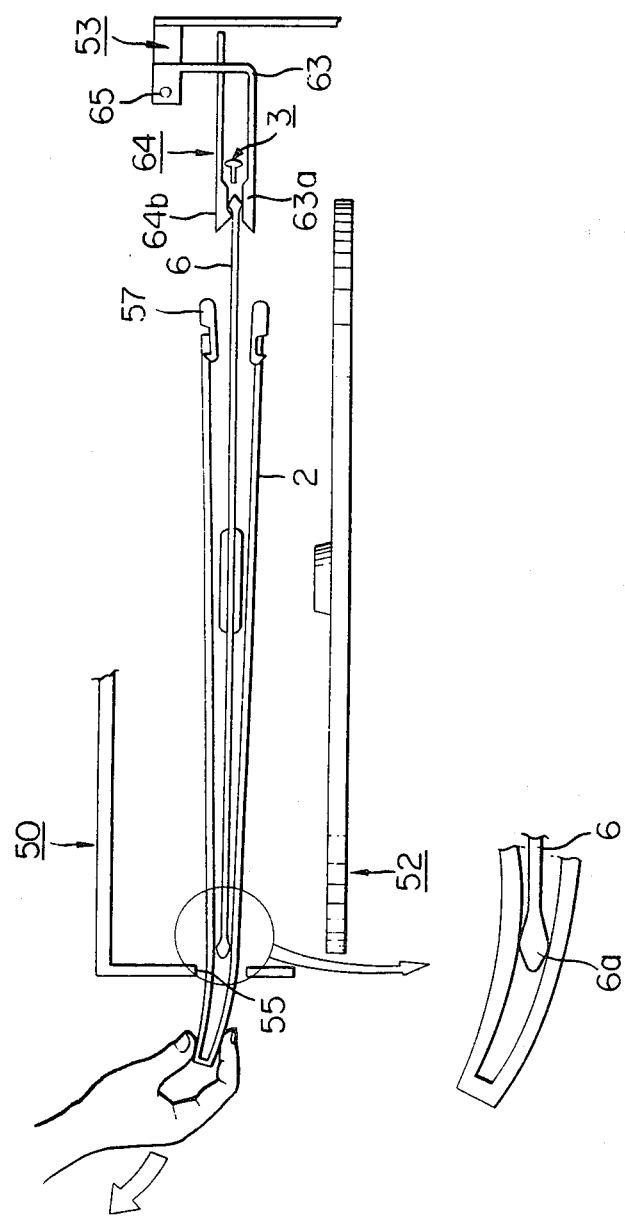
FIG. 9 is a side view of the disk reproducing device shown in FIG. 4, and is used to explain how a disk cartridge is manually pulled out of the disk reproducing device.

The fundamental construction of a prior art reproducing device for use with the disk cartridges of the type described above is shown in FIGS. 4 to 9. FIG. 4 is a perspective view showing the general construction thereof; FIG. 5 is a detailed view of a major portion thereof; Fig. 6 is a sectional view of FIG. 4; FIGS. 7A and 7B are partial views thereof used to explain the mode of operation thereof; FIGS. 8A and 8B show the disk 6 and cover 3, respectively, which are clamped; and FIG. 9 is a view used to explain in more detail FIGS. 8A and 8B.

The reproducing device, generally indicated by the reference numeral 50, has a mechanism 51 for enlarging the front end opening 7 of the main body 2 of the disk cartridge 1, a turntable 52 upon which is placed the disk 6, a disk-clamping mechanism 53, and a cover locking mechanism 54.

The mechanism 51 for enlarging the front end opening 7 (to be referred to as "the opening increasing mechanism" for brevity in this specification) is positioned adjacent to a disk-cartridge insertion slot 55 of the reproducing device 50 and is guided by a pair of guide rails 56 for the longitudinal direction indicated by the arrow $X_1$ or $X_2$. The opening increasing mechanism 51 comprises a pair of vertically spaced upper and lower beams 57 and 58 which extend transversely of the reproducing device 50. The upper and lower beams 57 and 58 are pivotably connected at their ends with pivot pins 57a and 58a to sleds 51a which slide along the guide rails 56. The upper and lower beams 57 and 58 have two pairs of expansion arms 59 as best shown in FIG. 4. When the upper and lower beams 57 and 58 are located adjacent to the disk-cartridge insertion slot 55, the expansion arms 59 cross each other, as best shown in FIG. 6, under the forces of leaf springs 60. But when the upper and lower beams 57 and 58 are displaced in the direction indicated by $X_1$, rollers 61, which are rotatably attached to the upper and lower beams 57 and 58, ride over the tapered rear ends 62 of the guide rails 56 and then over the flat or horizontal top surfaces thereof so that the upper and lower beams 57 and 58 are rotated about the pivot pins 57a and 58a, respectively, and are maintained in parallel with each other. As a result, the expansion arms 59 are spaced apart from each other.

The disk-clamping mechanism 53 is located adjacent to the rear end wall of the reproducing device 50 and has a lower clamping arm 63 and an upper clamping arm 64. The clamping arms 63 and 64 pass through the guide grooves 20 of the cover 3 of the disk cartridge 1 when the latter is inserted into the reproducing device 50, and the clamping arms 63 and 64 are inserted into the cartridge 1 so that the clamping arms 63 and 64 clamp the disk 6 at two points. The lower clamping arm 63 has two clamping pads 63a and is pivotally supported by an upper shaft 65 which in turn is supported by a pair of horizontal arm portions 73a of an L-shaped support 73. The lower clamping arm 63 is operatively connected to a sliding plate 118 which in turn is driven by a cam plate 115 to be described in detail below. The lower clamping arm 63 is normally biased under the force of a spring (not shown) so as to rotate in the direction indicated by the arrow C. The upper clamping arm 64 comprises arm portions 64a, clamping pads 64b at the free ends of the arm portions 64a and a stopper pin 64c attached to the rear end of the clamping arm 64. The arm 64 is pivotably supported by the upper shaft 65.

The reproducing device 50 has two cover locking mechanisms 54 and 54a which are located symmetrically of the longitudinal center line or axis of the device 50 and are identical in construction and mode of operation. It suffices, therefore, to explain only one mechanism 54. The parts of the other mechanism 54a are designated by similar reference numerals with a suffix a. The locking lever 70 is substantially in the form of a U in cross section (See 54a) and is pivotably connected with a pivot pin 71 to a push lever 72 which in turn is pivotably connected with a pivot pin 74 to the L-shaped support 73, and is normally biased under the force of a spring (not shown) in the direction indicated by the arrow G. The lower horizontal portion or arm of the locking lever 70 has a cam groove 75 which slidably receives a fixed pin or cam follower 76 extended from the support 73. Therefore, as the push lever 72 swings about its pivot pin 74, the locking lever 70 is caused to swing in the direction E or F in FIG. 4. A push or pressure plate 77 (See FIG. 8A) is securely attached to the push lever 72 for engagement with the front wall or flange portion 18 of the cover 3. A releasing means 80 which is securely attached to the support 73 is adapted to engage with the tapered portion 26 of the cover 3 (See FIG. 1). Referring particularly to FIG. 5, an L-shaped locking cam 85 which is pivotably connected to the support 73 with a pivot pin 81 has one arm formed with a cam groove 83 and an engaging projection 84 and the other arm with an engaging pin 82. The locking cam 85 is normally biased under the force of a spring 85a to rotate in the direction indicated by the arrow H. A locking pin 78 which rotatably interconnects the push levers 72 and 72a is slidably fitted into an L-shaped cam groove 83a of the locking cam 85. A release lever 87 is pivotably connected at its lower end with a pivot pin 86 to the support 73 and is normally biased under the force of a spring 89 in the direction indicated by the arrow K in FIG. 5. The upper end of the release lever 87 engages the upper shaft 65 so that the angle of rotation of the release lever 87 in the direction K the (clockwise direction) in FIG. 5 is limited. One end of an auxiliary or connecting lever 90 is pivotably connected with a pin 88 to the release lever 87 so that when the release lever 72 is swung in the direction indicated by the arrow M, the auxiliary or connecting lever 90 is displaced in the direction indicated by the arrow J. The connecting lever 90 has an elongated groove at the other end thereof and the engaging pin 82 of the locking cam 85 is slidably fitted into this elongated groove. An engaging member 92 is pivotably connected with a pivot pin 91 to the release lever 87 at the position adjacent to the upper end thereof, and is biased under the force of a bias spring 93 loaded between the push lever 72 and the engaging member 92. Depending upon the position or movement of the push lever 72, the engaging member 92 assumes the position as shown in FIG. 7A in which the bias spring 93 is shown as being compressed, or the position as shown in FIG. 7B in which the spring 93 is shown as being expanded.

The turntable 52 is drivingly coupled through a boss 101 to a motor 100 (See FIG. 6). A disk positioning means which is disposed coaxially of and is vertically movable through the turntable 52 for engagement with or disengagement from the center hole of the disk 6 has an upper ring 102 which is adapted to engage the center hole of the disk 6, a lower ring 104 and legs 103 interconnecting the upper and lower rings 102 and 104. The lower ring 104 rests upon a lift plate 107 which is vertically movable and is normally biased upwardly under the forces of four springs 106 loaded between the lift plate 107 and spring-retaining plates 105. An engaging pin 108 is extended from the lift plate 107 and engages one end, which is bifurcated, of a lift lever 110 which is pivoted by a pivot pin 109. The other end of the lift lever 110 is connected to an actuating cam 112 with a connecting link 111.

The actuating cam 112 is supported by pivot pins 113 for pivotal movement in the direction as indicated by the arrow N or P in FIG. 4. The lift lever 110 has a cam-follower roller 114 which is rotatably mounted thereon at the position between the ends thereof for engagement with an upright plate cam 116 extended from a horizontal plate cam 115 which in turn is slidably in the directions indicated by the arrow Z by a drive means (not shown). Therefore, the engagement of the cam-follower roller 114 of the lift lever 110 with the upright plate cam 116 is dependent upon the position of the horizontal plate cam 115. The sliding plate 118, which activates the lower clamping arm 63 as previously described, has a pin slidably fitted into a cam groove 117 of the horizontal plate cam 115 so that as the latter is moved in the direction U or V, the sliding plate 118 is caused to move in the direction indicated by the arrow $X_1$ or $X_2$.

Referring still to FIGS. 4 to 9, the mode of operation of the reproducing device with the above-described construction will be explained. When the disk cartridge 1 is inserted through the cartridge insertion slot 55 into the reproducing device in such a manner that the cover 3 of the cartridge 1 is directed forward, the expansion arms 59, which are closed, enter the notches or recesses 19 of the cover 3 while the opening increasing mechanism 51 is moved in the direction indicated by the arrow $X_1$ as the disk-cartridge 1 is pushed into the device 50. The positive entrance of the expansion arms 59 into the main body 2 is ensured by the tapered portions 14 at the open front end of the main body (See FIG. 1). As the cartridge 1 is further pushed into the reproducing device 50, the opening increasing mechanism 51 is further moved toward the direction $X_1$, so that the expansion arms 59 are opened or spaced apart from each other to engage the engaging slots 12 of the main body 2, and consequently the front opening of the main body is increased or expanded. Thereafter, the disk cartridge 1 is further pushed into the reproducing device 50 while its front opening is maintained in the expanded or increased state. As previously described the main body 2 is formed with elongated guide grooves 17 so that only light force is needed to expand the front opening 7. The projections 24 of the cover 3 are still in engagement with the engaging recesses 16 of the main body 2 (See FIG. 1) so that even when the disk cartridge 1 is pulled out of the reproducing device 50 at this stage, the cover 3 can move in unison with the main body 2 and consequently the cover 3 alone is prevented from being left in the reproducing device 50. When the disk cartridge 1 is further pushed into the device 50, a roller 119 which is attached to the opening increasing mechanism 51 (See FIG. 4) engages the actuating cam 112 to cause the latter to swing in the direction indicated by the arrow P. The rotation of the actuating cam 112 is transmitted through the connecting link 111 to the lift lever 110 so that the lever 110 is caused to rotate in the direction indicated by the arrow R to lower the lift plate 107 against the springs 106; and consequently the upper ring 102 of the disk positioning means is lowered below the upper surface of the turntable 52. As a result, further insertion of the disk cartridge 1 is permitted. Under these conditions, the upright plate cam 116 is still maintained out of engagement from the roller 114 of the lift lever 110, so that the above-described rotation of the lift lever 110 is permitted. When the disk cartridge 1 is further pushed into the reproducing device 50 and consequently the opening increasing mechanism 51 is further displaced in the direction $X_1$, the release means 80 and 80a enter the disk cartridge 1 and engage the tapered ends 26 of the arms 25 of the cover 3 so that the arms 25 are forced to bend themselves transversely inward. As a consequence, the projections 24 are disengaged from the recesses 16 of the main body 2 and, therefore, the cover 3 is released from the main body 2.

In this case, the engaging member 92 (See also FIG. 5) is in the position as shown in FIG. 7A; that is, it is out of the paths of the upper and lower beams 57 and 58. As the cover 3 is released from the main body 2, the front wall or flange portions 18 of the cover 3 push the pusher or pressure plates 77 and 77a (See FIG. 8) so that the push levers 72 and 72a are caused to rotate in the direction as indicated by the arrow T, so that the locking pin 78 moves along the cam groove 83 toward the L-shaped cam groove 83a thereof. Then, under the force of the spring 85a, the locking cam 85 is caused to rotate about its pivot pin 81 in the direction indicated by the arrow H, so that the push levers 72 and 72a are brought to and locked at predetermined positions. As the push lever 72 (72a) is rotated, its pin 76, which is slidably fitted into the cam groove 75 of the locking lever 70, causes the lever 70 to rotate in the direction indicated by the arrow E and engage the recess 19 of the cover 3 (See FIG. 8A), whereby the cover 3 is locked in position.

As the locking cam 85 is rotated in the direction indicated by the arrow H, the upper and lower clamping arms 64 and 63 clamp the disk 6 as shown in FIGS. 8A and 8B and are maintained in this clamping position because the engagement of the engaging projection 84 of the locking cam 85 with the stopper pin 64c limits the rotation of the upper clamping arm 64 in the direction indicated by the arrow C. Under these conditions, the engaging member 92 is brought to and maintained in the position as shown in FIG. 7B, but is out of engagement of the upper beam 57 of the main body 2; that is, the engaging member 92 will not prevent the movement of the upper beam 57 in the direction indicated by the arrow $X_2$.

Thereafter, the disk cartridge 1 is pulled out of the reproducing device 50 in the direction indicated by arrow $X_2$ (See FIG. 4). Then the cover 3 and the disk 6 remain in the reproducing device 50 while the main body 2 is pulled out of the device 50. That is, the disk 6 is pulled out of the main body 2. In this case, the front opening 7 of the main body 2 is still maintained in the increased or expanded state so that any damage to the disk 6 due to the contact of the main body 2 with the disk can be avoided. Immediately before the disk 6 is completely pulled out of the main body 2, the roller 119 of the opening increasing mechanism 51, which is pulled back together with the main body 2, is disengaged from the actuating cam 112 so that the lift plate 107 is caused to move upward under the forces of the springs 106 and consequently the upper ring 102 of the disk positioning means engages with the center hole of the disk 6. After the main body 2 is pulled completely out of the reproducing device 50, the cover 3 is maintained in the locked position by the locking mechanism 54 and 54a while the disk 6 is maintained at a predetermined play position by the clamping arms 63 and 64 and the upper ring 102 of the disk positioning means as shown in FIG. 8A. More specifically, the movement of the cover 3 which is now clamped by the locking mechanism 54 and 54a is limited by the engagement of the front wall or flange portions 18 of the cover 3 with the push or pressure plate 77 while the disk 6 is maintained in a stable manner by the clamping arms 63 and 64 and by the upper ring 102.

Thereafter, a play button or the like (not shown) is depressed. Then, the drive means (not shown) causes the horizontal plate cam 115 in the direction as indicated by the arrow U so that the sliding plate 118 is caused to move in the direction as indicated by the arrow $X_1$ in the manner as described before. Therefore, the lower clamping arm 63, which is connected to the sliding plate 118 through a connecting means (not shown), is caused to rotate in the direction as indicated by the arrow D. Concurrently, the upright plate cam 116, which extends from the horizontal plate cam 115, engages the roller 114 of the lift lever 110, whereby as the horizontal plate cam 115 is displaced in the direction U the lift lever 110 is caused to rotate in the direction as indicated by the arrow R. Thus, the clamping arms 63 and 64 release the disk 6 to place it over the turntable 52.

Thereafter, the motor 100 is energized to drive the disk 6, whereby data recorded on the disk 6 is reproduced.

Next, the mode of pulling the disk 6 out of the reproducing device 50 after the completion of the reproduction will be described. In response to the completion of the reproduction, the turntable 52 is automatically stopped and then the horizontal plate cam 115 is caused to move in the direction indicated by the arrow V, so that the roller 114 of the lift lever 110 is permitted to move upward along the cam profile edge of the upright plate cam 116 and as a consequence the lift lever 110 is permitted to move upward under the forces of the springs 106. Therefore the disk 6, which is still in engagement with the upper ring 102 of the disk positioning means, is lifted away from the turntable 52. Concurrently, the sliding plate 118 is caused to move in the direction $X_2$ so that the lower clamping arm 63, which is connected to the sliding plate 118, is caused to rotate in the direction indicated by the arrow C so as to again cooperate with the clamping arm 64 to clamp the disk 6, as shown in FIG. 8A.

Next, the main body 2, which is now empty, is again inserted into the reproducing device 50. Immediately before the main body 2 is completely inserted, the upper beam 57 thereof engages the engaging member 92 as shown in FIG. 7B. When the main body 2 is further inserted, it causes the release lever 87 to move in the direction M (See Fig. 5) through the engaging member 92, so that the link or auxiliary lever 90 is caused to move in the direction indicated by the arrow J, and consequently the locking cam 85 is caused to move in the direction indicated by the arrow I. Then the connecting pin 78 is released from the transversely extending portion 83a of the L-shaped cam groove 83 of the locking cam 85 and concurrently the engaging projection 84 thereof is released from the stopper pin 64c. Then, the push levers 72 and 72a are permitted, under the forces of bias springs (not shown), to return to their initial positions while the clamping arms 63 and 64 release the disk 6 to permit it to be retained in the main body 2. When the main body 2 is pulled out in the direction $X_2$, the disk 6, which is now inserted and retained in the main body 2, and the cover 3, which is now engaged again with the main body 2, can be pulled out of the reproducing device 50 together with the main body 2. The re-attachment or re-engagement of the cover 3 with the main body 2 is performed in reverse to the detachment described above.

The disk cartridge 1 and the reproducing device 50 described above have some problems as described below.

FIG. 9 shows the main body 2 being pulled out of the reproducing device 50 through the cartridge insertion slot 55 after the disk 6 has been clamped by the clamping mechanism 53 in the manner described above. In general, the insertion or withdrawal of the disk cartridge 1 is manually performed, so that the disk cartridge 1 cannot be inserted into or pulled out of the reproducing device 50 under ideal conditions. As a result, the insertion or withdrawal of the cartridge 1 frequently adversely affects the proper operations of the mechanisms described above. When the disk cartridge 1 is pulled out of the reproducing device 50 after the disk 6 has been set in position in the manner described above, the main body 2 is frequently bent upwardly as shown in FIG. 9. Bending of the main body 2 causes frictional contacts between the main body 2 and the groove guard 6a, which is formed along the rim of the disk 6 and projects upwardly and downwardly from the recording surfaces thereof, so that relatively strong pulling forces are exerted upon the disk 6 and consequently the disk 6; is forced to be released from the clamping mechanism 53. As a result, the naked or unprotected disk 6 is pulled out of the reproducing device 50 so that the data or information recording surfaces of the disk 6 are brought into contact with other parts and consequently are severely damaged. In some cases, the mechanisms of the reproducing device 50 are also damaged. In order to solve these problems, there have been proposed various improvements both in material and shape of the clamping arms 63 and 64 and their clamping pads 63a and 64b, but so far such suggested improvements have been unsuccessful in providing sufficient forces to clamp or retain the disk 6 while the empty main body 2 is being pulled out of the reproducing device 50.

DESCRIPTION OF THE PREFERRED EMBODIMENTS

Figure 10:
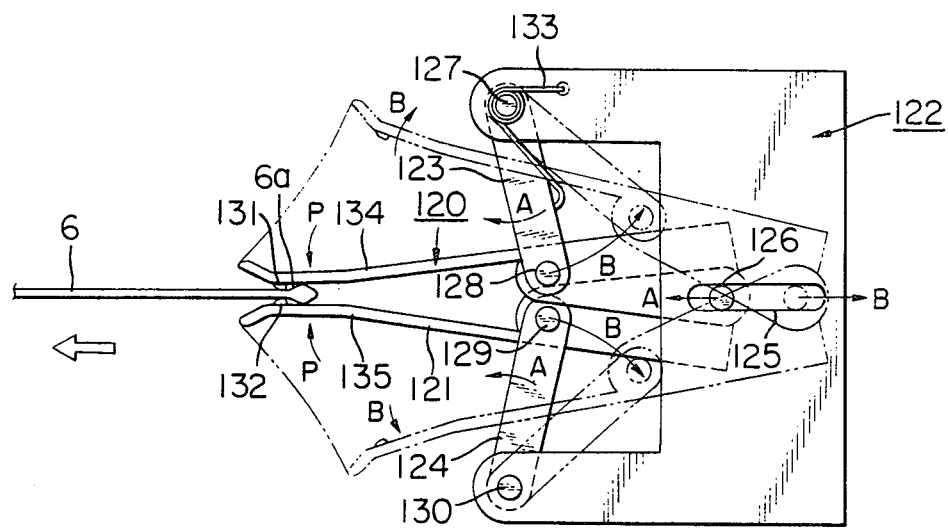
FIGS. 10, 11, 12, 13A and 13B are side views showing first to fifth preferred embodiments, respectively, of the present invention.

FIGS. 10 to 13B show first to fifth preferred embodiments, respectively, of the present invention and FIGS. 14 to 18B are views used to explain in detail the mode of operation of the embodiment shown in FIG. 10.

Referring to FIG. 10 illustrating a first embodiment of the present invention, a disk 6 is shown by the solid lines as being clamped by two fingers 120 and 121 while the released disk 6 is shown by the two-dotted chain lines. A clamping mechanism comprises a support or base 122 and cranks 123 and 124 to which are pivotably connected with pivot pins 128 and 129 the fingers 120 and 121. One end of each of the cranks 123 and 124 pivotably connected with respective ones of pivot pins 127 and 130 to the support 122. The support 122 is formed with a longitudinally extending guide groove 125 into which a pivot pin M26 is slidably fitted; which pivot pin pivotably interconnects the fingers or connecting rods 120 and 121 with each other. Therefore, the clamping mechanism comprises a five-bar linkage which is symmetrical about the horizontal line passing through the axis of the pivot pin 126; that is, a combination of two four-bar linkages. The parts are rotated and displaced in the directions indicated by the arrows A when the clamping mechanism clamps the disk 6, and in the opposite directions as indicated by the arrows B when the disk 6 is released. The loci described by the free ends of the fingers 120 and 121 are indicated by two-dot-chain-line curves. It is seen that the free ends of the fingers 120 and 121 gradually approach toward the plane containing the disk 6 as the cranks 123 and 124 rotate in the directions A. A bias spring 133 is loaded between the upper crank 123 and the support 122 in such a way that the cranks 123 and 124 and the fingers 120 and 121 are normally rotated and displaced in the directions A, and consequently the clamping or arresting surfaces 134 and 135 of the fingers 120 and 121 exert suitable clamping pressures P against the groove guard 6a of the disk 6.

When a force is exerted on the disk 6 so as to pull the same in the direction indicated by a white arrow, the guard 6a engages the projections 131 and 132 of the fingers 120 and 121 so that the pulling force is transmitted to the clamping mechanism, and consequently the clamping mechanism exerts further clamping forces upon the disk. That is, the pulling force causes the fingers 120 and 121 and the cranks 123 and 124 to rotate further in the directions A. Thus, it becomes impossible to withdraw the disk 6 from the clamping mechanism, even when a pulling force is applied to the disk 6. More specifically, even if the bending force exerted on the main body 2 is transmitted to the disk 6 as a pulling force, the disk 6 is held in position by the clamping mechanism.

To release a disk 6, the releasing force is applied to the pivot pin 126 so as to displace it in the direction B, so that the fingers 120 and 121 are retracted away from the disk 1 to the positions indicated by the two-dot-chain lines.

Figure 11:
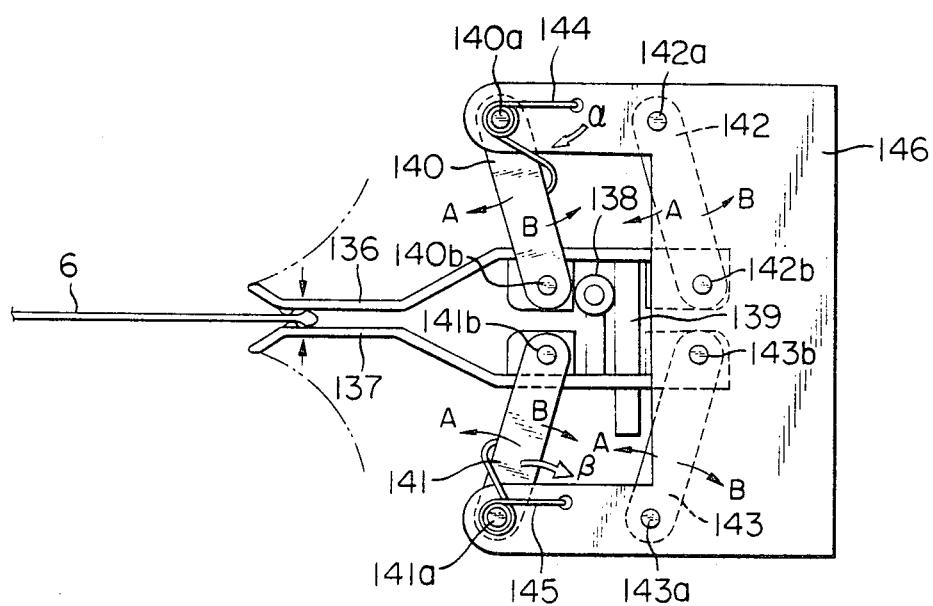

FIG. 11 shows a second embodiment of the present invention which is based on a principle similar to that of the first embodiment described above. As with the first embodiment, as the free ends of fingers 136 and 137 approach toward the disk cartridge insertion slot or toward the disk 6, they move toward the center plane; that is, the plane containing the diameter of the disk 6. Furthermore, like the first embodiment, the clamping forces are enhanced if a pulling force is exerted on the disk 6, because of the reason previously described.

One ends of each cranks 140, 141, 142 and 143 is pivotably connected with pivot pins 140a, 141a, 142a and 143a, respectively, to a support or base 146 while the other end of each of the cranks 140 and 142 is pivotably connected with pivot pins 140b and 142b respectively, to the upper finger 136; and, in like manner, the other ends of the cranks 141 and 143 are pivotably connected with pivot pins 141b and 143b, respectively, to the lower finger 137. A bias spring 144 is loaded between the support 146 and the crank 140 in such a way that the crank 140 is normally biased in the direction A under the torque α. In like manner, a bias spring 145 is loaded between the support 146 and the crank 141 in such a way that the crank 141 is normally biased in the direction B under the torque β; the torque α being greater than the torque β. A roller 138 is rotatably supported by a bearing extending from the lower finger 137 and is normally maintained in contact with a rod 139 depending from the upper finger 136 under the forces of the bias springs 144 and 145. Therefore the movements of the upper and lower fingers 136 and 137 are always symmetrical about the horizontal plane; that is, the extension of the center plane of the disk 6. The cranks 140 to 143 are subjected to forces which are equal to the difference between torque α and β so that they are normally biased in the directions A.

Because of the above-described linkage, the free ends of the upper and lower fingers 136 and 137 describe the two-dot-chain-line curves, as in the case of the first embodiment. That is, the upper and lower fingers 136 and 137 are normally so biased that they are moved toward each other and hence toward the center plane of the disk 6. Therefore, the second embodiment has the same features as the first embodiment shown in FIG. 10.

Figure 12:
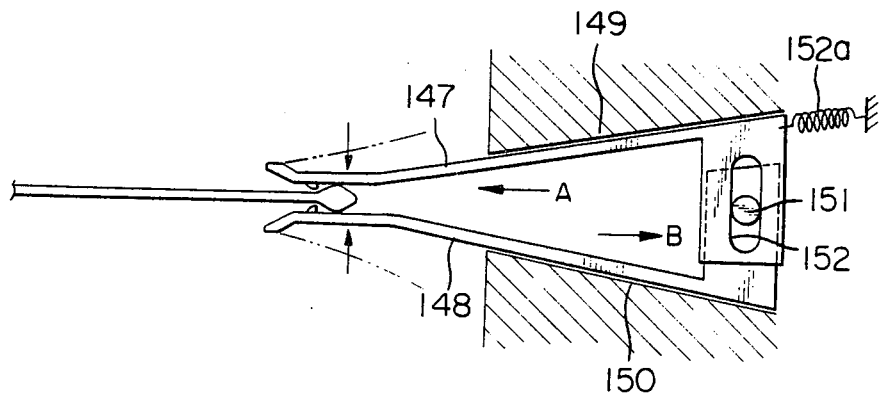

FIG. 12 shows a third embodiment of the present invention in which, as with the first or second embodiment described above, if a pulling force is exerted on the disk 6 which has been already clamped in position, the clamping forces P are further increased because the free ends of upper and lower fingers 147 and 148 are forced to move toward each other and, therefore, toward the center plane of the disk 6 as indicated by the two-dot-chain lines, because of the provision of tapered surfaces 149 and 150. The tapered surfaces 149 and 150 are in opposed relationship and converge at an angle toward the disk 6. A pin 151 extending from the lower finger 148 is slidably fitted into an elongated groove 152 formed in the upper finger 147, so that the upper and lower fingers are interconnected to each other even when they are caused to slide in intimate contact with their corresponding or mating tapered surfaces 149 and 150, respectively. In addition, a bias spring 152a is loaded between the upper finger 147 and a stationary part (shown as a hatched portion) so that the upper and lower fingers 147 and 148 are normally biased in the direction A. As previously described, the free ends of the upper and lower fingers 147 and 148 describe the loci indicated by the two-dot-chain lines, and the third embodiment has the same effects and features as the first embodiment described before with reference to FIG. 10.

Figure 13A:
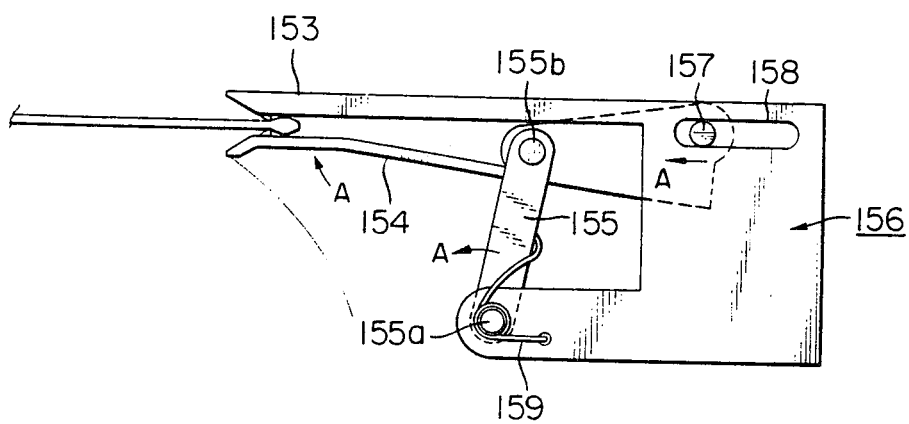

FIG. 13A shows a fourth embodiment of the present invention which utilizes a four-bar linkage similar to the lower half of the five-bar linkage used in the first embodiment shown in FIG. 10. An upper finger 153 is formed integral with or otherwise rigidly connected to a base or support 156. The operation of a lower finger 154 is similar to that of the finger 131 of the first embodiment as shown in FIG. 10. One end of a crank 155 is pivotably connected with a pivot pin 155a to a support 156, while the other end thereof is connected to the lower finger 154 with a pivot pin 155b. A pin 157 extends from the lower finger 154 and is slidably fitted into an elongated slot 158 formed in the support 156. A bias spring 159 is loaded between the crank 155 and the support 156, so that the lower finger 154 is normally biased in the direction A.

The free end of the lower finger 154 also describes the locus as indicated by the two-dot-chain line. That is, when the lower finger 154 is forced to move in the direction A, its free end moves toward that of the upper arm 153 and thus the center plane of the disk 6. It follows therefore that, as in the case of the first, second and third embodiments described with reference to FIGS. 10, 11 and 12, respectively, if a pulling force is exerted on the disk 6, the clamping forces exerted on the disk 6 are further increased.

In the fourth embodiment, the upper finger 153 which coacts with the lower finger 154 has been described as being stationary, but it is apparent that the fourth embodiment has the same effects and features as the first or second embodiment described with reference to FIG. 10 or 11. It is also apparent from the foregoing description that one of the upper and lower fingers in the second or third embodiment can be held stationary.

In the first to fourth embodiments as shown in FIGS. 10 to 13, the upper and lower fingers are normally imparted with the clamping forces, and if a pulling force is exerted on the clamped disk 6, the clamping forces are further increased; but it is to be understood that the present invention is not limited to such arrangements as described above and can be modified as will be described below.

For instance, according to the present invention, the pulling force exerted on the disk 6 can be inverted and transmitted to the fingers so that the clamping forces can be further enhanced.

Figure 13B:
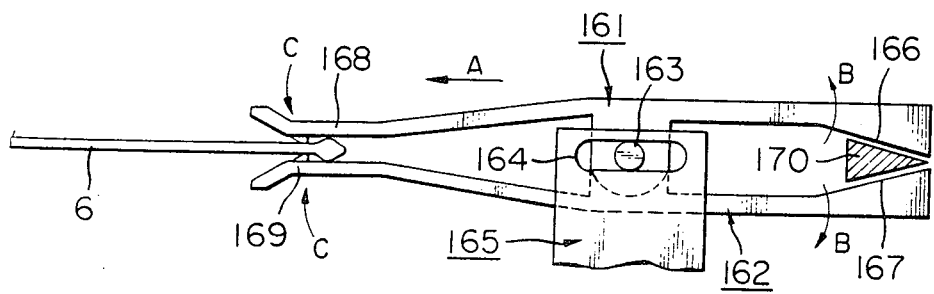

For example, FIG. 13B shows a fifth embodiment of the present invention, in which upper and lower fingers 161 and 162 are pivotably connected to each other with a pivot pin 163 and have projections 168 and 169, respectively, at first ends thereof. The other ends of the upper and lower fingers 161 and 162 are tapered as indicated by 166 and 167, respectively, and about a wedge-shaped member 170 whose included angle is substantially equal to that between the upper and lower tapered surfaces 166 and 167. The pivot pin 163 is slidably fitted into an elongated slot 164 formed in a support or bracket 165, bracket which in turn is securely attached to a chassis (not shown).

When a pulling force is exerted on the disk 6, the upper and lower fingers 161 and 162 are forced to move in the direction A and consequently the tapered surfaces 166 and 167, which are in contact with the tapered surfaces of the wedge-shaped member 170, are caused to move apart from each other in the directions B. As a result, the free ends of the upper and lower fingers 161 and 162 are forced to move toward each other in the directions C so that they can more strongly clamp the groove guard 6a of the disk 6.

In the first and second embodiments, the upper and lower fingers have been described as being pivoted to their respective cranks with the pivot pins; and in the fourth embodiment as shown in FIG. 13A, the upper end of the crank 155 has been described as being pivoted to the lower finger 154 with the pivot pin 155b. However, the present invention is not limited to the pin joints as described above, and other joints may be employed as needs demand. For instance, the fingers can be made integral with the cranks or the fingers can be so attached to the cranks that the former slide relative to the latter.

In the third embodiment as shown in FIG. 12, the loci of the free ends of the upper and lower fingers 147 and 148 are determined by the tapered surfaces 149 and 150, but it is also to be understood that the present invention is not limited to this arrangement and that other modifications can be effected. For instance, guide rails can be employed so as to confine the movements of the upper and lower fingers 147 and 148.

Figure 14:
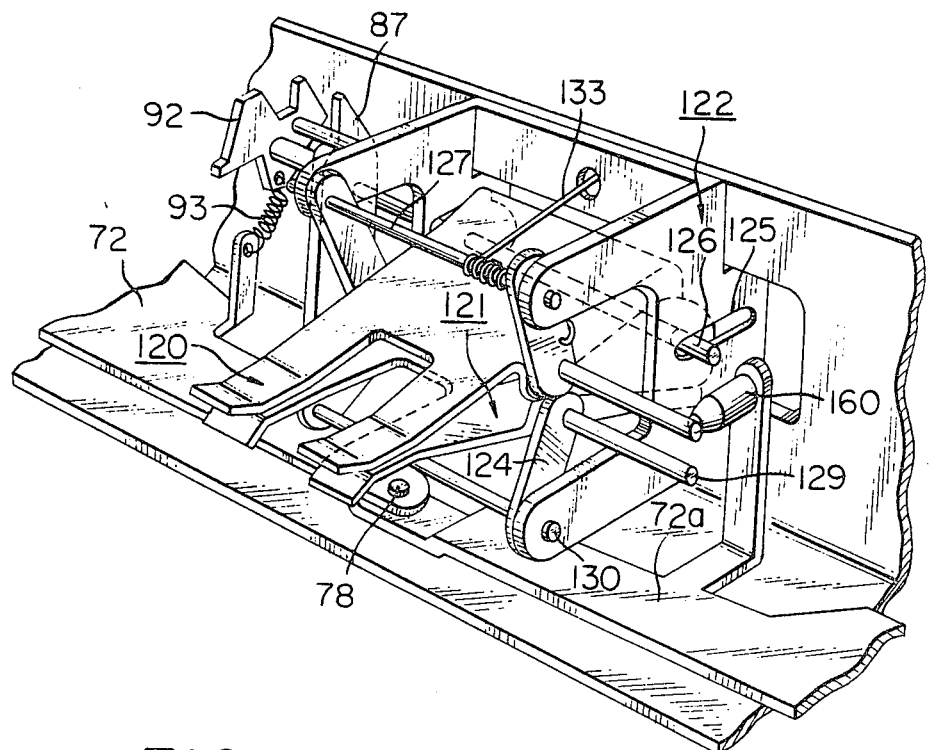
FIG. 14 is a perspective view of the first embodiment of the present invention, as shown in FIG. 10.

The mode of operation of the first embodiment as shown in FIG. 10 will be described in more detail below with reference to FIGS. 14 to 18B. FIG. 14 shows the first embodiment of the invention, applied to as a disk reproducing device of the type previously described.

Figure 15:
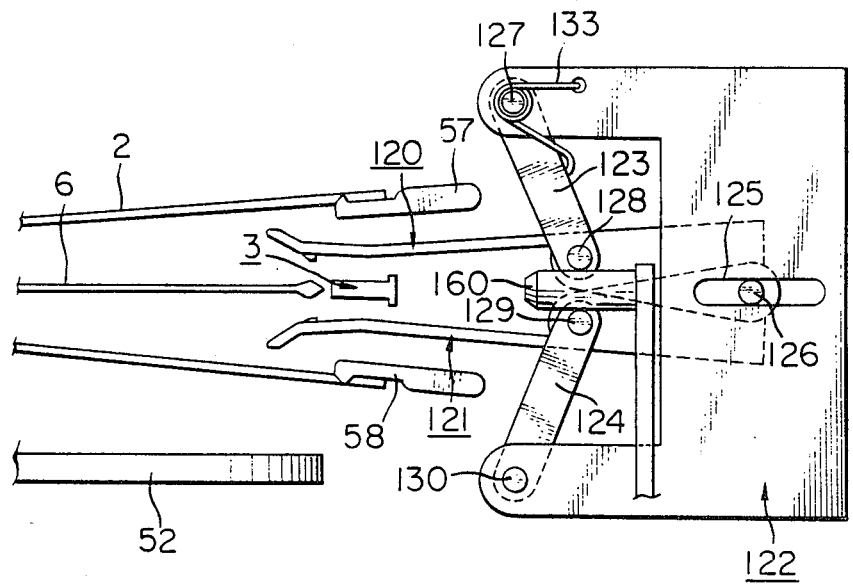
Figure 16:
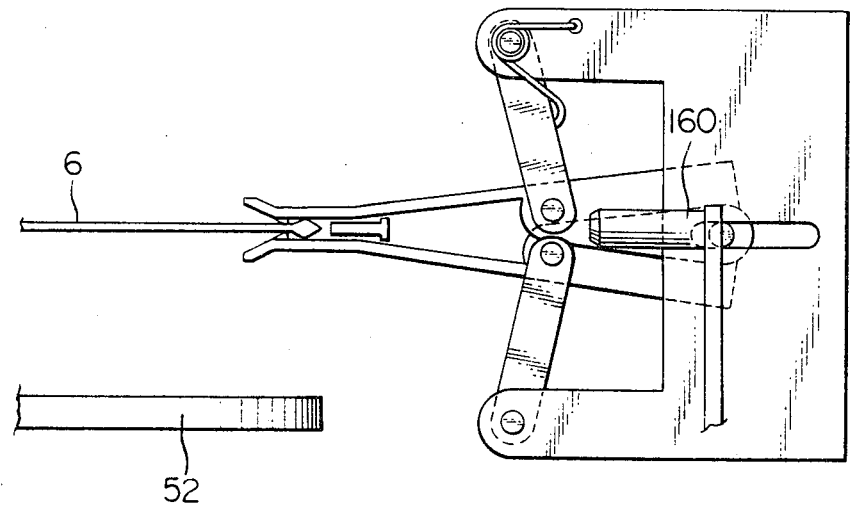

FIG. 15 shows that the main body 2, with the disk 6 enclosed therein, is inserted into the reproducing device and the open front end of the main body is being expanded by the upper and lower beams 57 and 58 of the opening increasing mechanism. Since a release rod 160 which is carried by the push lever 72a is interposed between the pivot pins 128 and 129, the upper and lower fingers 120 and 121 are maintained in spaced apart relationship. Therefore, the upper and lower fingers 120 and 121 can easily extend themselves through the cover 3 into the main body 2 so as to clamp the disk 6. When the main body 2 is further inserted, the push levers 72 and 72a are retracted so that the release rod 160 is released from the pivot pins 128 and 129 as shown in FIG. 16. Then the upper and lower fingers 120 and 121 firmly grip the disk 6. As already described with reference to FIG. 10, even if a pulling force is exerted on the disk 6, the disk is retained in position by the clamping upper and lower fingers 120 and 121. Thus, the present invention has succeeded in completely solving the problem that if the disk cartridge is not correctly pulled out from the reproducing device, the inserted disk 6 is pulled out from the clamping arms.

Figure 17:
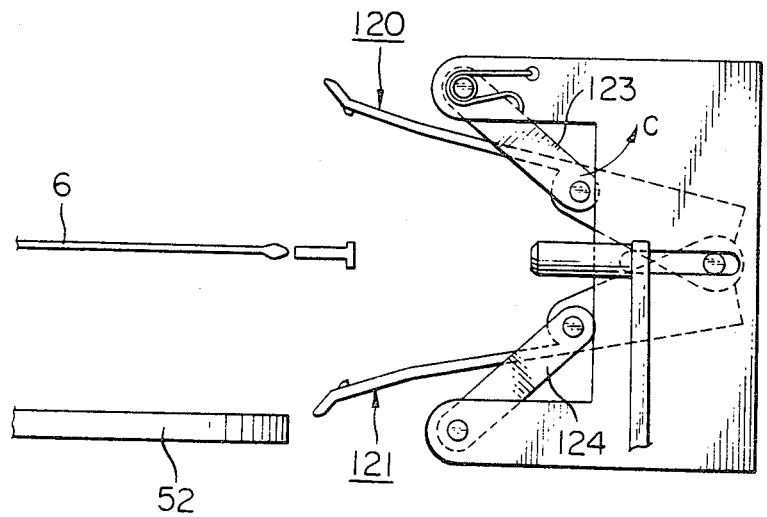
FIGS. 15, 16, 17, 18A and 18B are side views used to explain the mode of operation of the first embodiment of the invention.

In response to the depression of a play button or the like, a motor (not shown) is energized to rotate the crank 123 in the direction indicated by the arrow C in FIG. 17, so that the upper and lower fingers 120 and 121 are moved away from each other and hence the disk 6 is placed upon the turntable 52 in the manner previously described.

After the completion of the reproduction, the crank 123 is rotated in the direction opposite to that indicated by the arrow C, while the disk 6 is raised off the turntable 52 so that the upper and lower fingers 120 and 121 again firmly grip the disk 6 as shown in FIG. 16.

Figure 18A:
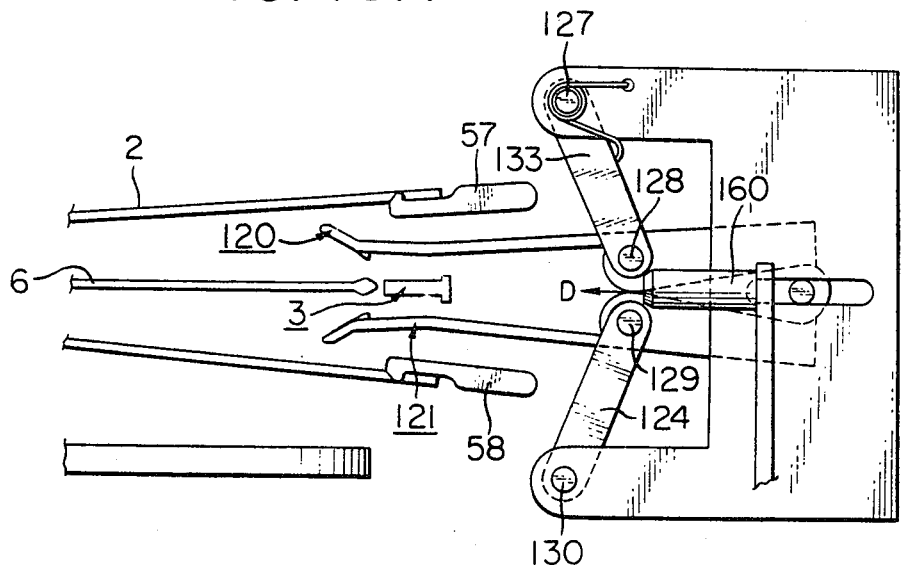
Figure 18B:
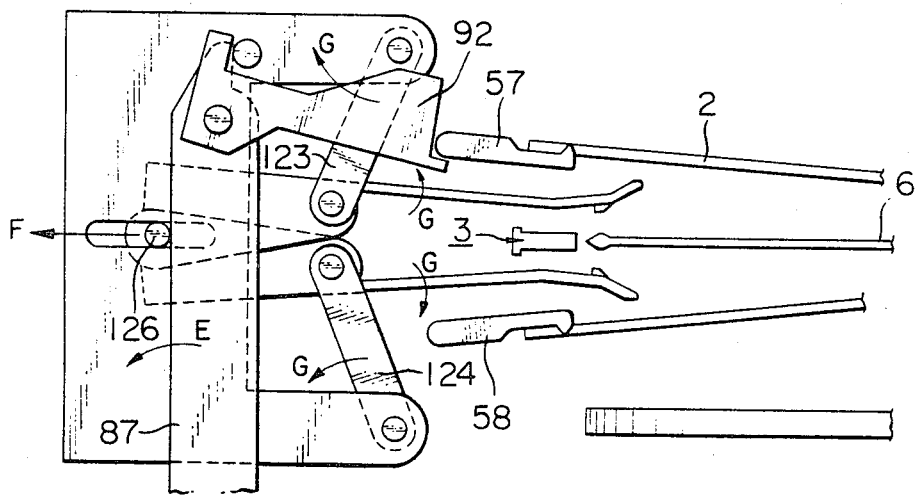

FIG. 18A is a view, as seen from one side of the disk clamping mechanism, illustrating the empty main body 2 inserted so as to recover the reproduced disk 6; and FIG. 18B is a view similar to that of FIG. 18A but seen from the other side. Immediately before the complete insertion of the main body 2, the upper beam 57 thereof engages the engaging member 92 as previously described; and when the main body 2 is further inserted, the release lever 87 is caused to rotate in the direction indicated by the arrow E through the engaging member 92 and push the connecting pin 126 in the direction indicated by the arrow F. Then the upper and lower fingers 120 and 121 and the cranks 123 and 124 are caused to rotate in the directions indicated by the arrows G, so that the disk 6 is released from the clamping fingers 120 and 121 as shown in FIG. 18B.

Concurrently, the push levers 72 and 72a are returned to their initial positions in the manner previously described, so that the release rod 160 is again pushed between the pivot pins 128 and 129, and consequently the upper and lower fingers 120 and 121 are moved away from each other, releasing the disk 6 as shown in FIG. 15. Therefore the disk 6 can now be completely enclosed in the main body 2. When the main body 2 is pulled out of the reproducing device, the cover 3 and the disk 6 are also pulled out together with the main body 2, in the manner previously described.

From the foregoing description, it is apparent that the present invention can be readily applied to existing disk recording and reproducing devices of the type described by merely replacing the disk clamping mechanisms, whereby the disk recording and reproducing devices can be made more reliable and dependable in operation.

More specifically, even when, as shown in FIG. 9, the empty main body is severely bent as it is pulled out of the reproducing device after the disk has been set in the play position, so that a strong pulling force is exerted on the disk, the disk clamping mechanism of the present invention can increase the clamping forces in response to an increase in the pulling force; and consequently the withdrawal of the disk from the disk clamping mechanism can be prevented.

In addition, even when the disks vary in thickness and shape of the groove guards, the disk clamping mechanisms of the present invention can exert suitable clamping forces on the disks. Furthermore, as previously described, the stronger the pulling force exerted on the disk, the stronger the clamping forces become. As a result, close dimensional tolerances of the parts are not needed to provide positive clamping forces, so that the present invention is adapted for mass production.

What is claimed is:

1. In a disk recording and reproducing device of the type having a disk insertion opening, wherein in response to the operation of inserting a case housing a disk through said disk insertion opening into said device, disk clamping means clamps a region adjacent the outer edge of said disk, and when said case is withdrawn from said device through said disk insertion opening, said disk is withdrawn out of said case,
   the improvement wherein said disk clamping means comprises:
   a first finger having a leading edge and extending in a direction of movement of said case through said disk insertion opening, the leading edge of said first finger having a first clamping member adapted to engage one major surface of a disk adjacent the periphery thereof;
   a second finger having a leading edge and extending in said direction, the leading edge of said second finger having a second clamping member adjacent said first clamping member and adapted to coact with said first clamping member so as to forcibly hold said disk therebetween, the other end of said second finger being movable in said direction of movement of said case through said disk insertion opening, said second clamping member being connected to a stationary member in such a way that said second clamping member can rotatably and longitudinally move toward and away from said first clamping member;
   an arm having one end rotatably pivoted to said stationary member, so that when said second finger is caused to move in the direction in which said case is withdrawn, said second clamping member moves toward said first clamping member, the other end of said arm being rotatably coupled to said second finger;

a leaf spring means for biasing said arm so that said second clamping member approaches said first clamping member;

separation means for separating said first clamping member from said second clamping member when said separation means is released and releasing means responsive to the initial insertion of said case through said disk insertion opening for releasing said separation means.

2. The improvement according to claim 1, wherein said first finger is securely fastened to a stationary member.

3. The improvement according to claim 1, wherein said clamping members coact to forcibly hold a groove guard protruding from the periphery of said disk, the end of said first finger remote from said first clamping member being rotatably held by the stationary member in such a way that said finger end is slidable in the direction in which the case is inserted or withdrawn, and said first clamping member moves toward and away from said second clamping member; further comprising a second arm having one end rotatably fixed with a third pin to said stationary member and another end rotatably fixed with a fourth pin to said first finger, in such a way that when said second finger is slidably moved in the direction in which said case is inserted or withdrawn, said second clamping member moves toward and away from said first clamping member; and a spring for biasing said second arm in such a way that the contact surface of said first finger moves toward the contact surface of said second finger.

4. A disk recording and reproducing device of the type having a disk insertion opening, wherein in response to the operation of inserting a case housing a disk therein into said device through said disk insertion opening, said disk having a groove guard adjacent the outer edge thereof, disk clamping means clamps said groove guard, and when said case is withdrawn from said device through said disk insertion opening, said disk is withdrawn out of said case, wherein said disk clamping means comprises:

first and second fingers each having a leading end and a clamping member at each said leading end, each of said fingers extending along a direction of movement of said case through said disk insertion opening;

a stationary member;

first and second arms each having a first end rotatably supported by said stationary member and a second end rotatably coupled to said first finger so that when said first and second fingers move in the direction in which said case is withdrawn, said clamping members move toward each other;

third and fourth arms each having a first end pivoted to said stationary member and a second end pivotably coupled to said second finger;

spring means for biasing said first arm in the direction in which the clamping members of said fingers move toward each other;

separation means for causing said fingers to move away from each other against the action of said spring when said separation means is released; and means responsive to an initial insertion of said case through said disk insertion opening for releasing said separation means.

5. A disk recording and reproducing device of the type having a disk insertion opening, wherein in response to the operation of inserting a case containing a disk through said disk insertion opening into said device, said disk having a groove guard adjacent the periphery thereof, disk clamping means clamps a groove guard formed at the outer edge of said disk, and when said case is withdrawn from said device through said insertion opening, said disk is withdrawn out of said case, wherein said disk clamping means comprises:

cam means comprising inclined surfaces which diverge in the direction in which said case is inserted through said disk insertion opening; and first and second fingers disposed on opposite sides of said disk insertion opening and having leading ends with contact surfaces adapted to make contact with the groove guard of said disk and forcibly clamp said disk, said fingers being slidably movable along said inclined surfaces and being interconnected with each other so that said fingers are rotatable with respect to each other and movable toward or away from each other.

6. A disk recording and reproducing device of the type having a disk insertion opening, wherein in response to the insertion of a case housing therein a disk through said disk insertion opening into said device, said disk having a groove guard adjacent the periphery thereof, disk clamping means clamps a groove guard formed at the outer edge of said disk, and when said case is withdrawn from said device through said disk insertion opening, said disk is withdrawn out of said case, wherein said disk clamping means comprises:

a first finger extending in a direction of movement of said case through said disk insertion opening;

a stationary member;

a second finger having a leading end and a contact surface at said leading end adapted to be urged toward said first finger so as to forcibly hold said groove guard between said contact surface and said first finger, said second finger being pivotably fixed to said stationary member so that said contact surface may move toward or away from said first finger while simultaneously moving in the direction in which said case is withdrawn; and a control member connected to said second finger for controlling the motion of said second finger so that when said second finger moves in the direction in which said case is withdrawn, said contact surface moves toward said first finger.

7. A disk recording and reproducing device as set forth in claim 6, wherein said first finger is securely fixed to said stationary member.

8. A disk recording and reproducing device as set forth in claim 6, wherein said first finger has at its leading end a contact surface adapted to contact with the groove guard of said disk and to coact with said second finger so as to forcibly hold said groove guard, said first finger being movable in the direction in which said case is inserted and withdrawn, said contact surface being pivotably carried by said stationary member in such A way that said contact surface moves toward or away from said first finger; and another member coupled to said second finger for causing said second finger to slide in the direction in which said case is withdrawn, so that said contact surface moves toward said first finger.

* * * * *